(12) United States Patent
Hua et al.

(10) Patent No.: US 10,917,759 B2
(45) Date of Patent: **\*Feb. 9, 2021**

(54) SMS-IWF REASSIGNMENT FOR SMS LINK OUTAGE

(71) Applicant: Verizon Patent and Licensing Inc., Arlington, VA (US)

(72) Inventors: Suzann Hua, Walnut Creek, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/449,960

(22) Filed: Jun. 24, 2019

(65) Prior Publication Data

US 2019/0313217 A1    Oct. 10, 2019

Related U.S. Application Data

(63) Continuation of application No. 15/631,660, filed on Jun. 23, 2017, now Pat. No. 10,375,535.

(51) Int. Cl.
| | |
|---|---|
| *H04W 4/14* | (2009.01) |
| *H04W 92/14* | (2009.01) |
| *H04W 72/00* | (2009.01) |
| *H04W 48/12* | (2009.01) |
| *H04B 1/707* | (2011.01) |
| *H04W 80/04* | (2009.01) |
| *H04W 76/19* | (2018.01) |
| *H04L 29/14* | (2006.01) |

(52) U.S. Cl.
CPC .............. *H04W 4/14* (2013.01); *H04B 1/707* (2013.01); *H04L 69/40* (2013.01); *H04W 48/12* (2013.01); *H04W 72/005* (2013.01); *H04W 76/19* (2018.02); *H04W 80/04* (2013.01); *H04W 92/14* (2013.01)

(58) Field of Classification Search
CPC .......... H04W 28/10; H04W 8/26; H04W 8/08
See application file for complete search history.

(56) References Cited

U.S. PATENT DOCUMENTS

| | | | | |
|---|---|---|---|---|
| 2011/0021216 A1* | 1/2011 | Pudney | ................... | H04W 4/12 455/466 |
| 2011/0280217 A1* | 11/2011 | Drevon | ................. | H04W 48/18 370/331 |
| 2015/0119092 A1* | 4/2015 | Yi | ........................... | H04W 4/70 455/466 |

\* cited by examiner

*Primary Examiner* — Zhiren Qin (57) ABSTRACT

A computer device may include a memory configured to store instructions and a processor configured to execute the instructions to receive a service request from a user equipment (UE) device via a wireless access network; identify a Short Message Service Inter-Working Function (SMS-IWF) device associated with the UE device; and determine that the identified SMS-IWF device is associated with a link failure. The processor may further be configured to instruct the UE device to detach based on determining that the identified SMS-IWF device is associated with a link failure; receive a re-attach request from the UE device, in response to instructing the UE device to detach; and assign a functioning SMS-IWF device to the UE device, in response to receiving the re-attach request.

20 Claims, 9 Drawing Sheets

SMS-IWF REASSIGNMENT FOR SMS LINK OUTAGE

CROSS REFERENCE TO RELATED APPLICATIONS

This patent application is a continuation of U.S. patent application Ser. No. 15/631,660, filed on Jun. 23, 2017, the contents of which are hereby incorporated herein by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. The provider may manage a large number of wireless access networks and a particular wireless access network may include a large number of devices, resulting in various technological challenges. One example of such technological challenges includes timely delivery of Short Message Service (SMS) messages.

DETAILED DESCRIPTION OF PREFERRED EMBODIMENTS

The following detailed description refers to the accompanying drawings. The same reference numbers in different drawings identify the same or similar elements.

As the data traffic and number of user equipment (UE) devices using wireless access networks increase, the number of different types of UE devices and the number of different types of data also increase. For example, an exponential growth in Internet of Things (IoT) applications has led to an increasing number of different types of UE devices employing machine-to-machine (M2M) communication, such as Machine-Type Communication (MTC), a type of M2M communication standard developed by the 3$^{rd}$ Generation Partnership Project (3GPP). With the growing number of MTC devices, wireless access network may need to support an increasing number of services.

An important service for MTC devices is Short Message Service (SMS) over Non-access stratum (NAS). Often, MTC devices need to send or receive a small amount of data and SMS over NAS may be used for such communications. The NAS protocol is used in Long Term Evolution (LTE) wireless access networks for control plane signaling between UE devices and a Mobility Management Entity (MME) of the LTE wireless access network. For example, the NAS layer of a protocol stack may be used for attach and/or detach requests, tracking area updates (TAUs), authentication, and/or establishing bearers for Internet Protocol (IP) connectivity between a UE device and an IP network, while bearers are used for data plane communications between the UE device and the IP network. Thus, SMS over NAS may be a type of non-IP communication that does not require the establishment of an IP bearer and that, therefore, saves bandwidth, memory, and/or computing resources for an LTE wireless access network.

SMS over NAS may be implemented using SMS Inter-Working Function (SMS-IWF) devices. An SMS-IWF device may interface a wireless access network with an SMS switching center (SMSC). For example, an application server (AS) may send an SMS message for a UE device to the SMSC and the SMSC may identify an SMS-IWF device associated with the UE device. The SMS-IWF device may identify an MME associated with the UE device and may forward the SMS message to the identified MME. The MME may then send the SMS message to the UE device using NAS signaling.

When a link between the MME and a particular SMS-IWF device fails, SMS messages for UE devices associated with the particular SMS-IWF device may not get delivered. One attempt to address such link failures is to have the particular SMS-IWF device send SMS messages to another MME. However, the other MME may not be able to identify the UE device that is the intended recipient of the SMS message based on information included in the SMS message. For example, the other MME may not store identifying information for the UE device, such as the System Architecture Evolution (SAE) Temporary Mobile Subscriber Identifier (S-TMSI) and/or an associated Tracking Area Indication (TAI) list. Therefore, the other MME may need to send a paging request to every base station in the MME pool. The MME pool may include thousands of base stations. Thus, the MME may flood the network with the paging request, using up network resources and negatively impacting the performance of the network.

However, without addressing the potential of link failures of links between MMES and SMS-IWF devices, if a link failure does occur, a stationary MTC UE device may never receive an SMS message until the UE device originates an SMS message or reboots. For example, an MTC UE device (e.g., a utility meter) may only send data once a month. Thus, the UE device may not receive a pending SMS message from an AS, such as, for example, an SMS message to perform an update or send a report to the AS, for weeks.

Implementations described herein relate to SMS-IWF device reassignment for an SMS link outage. An MME may be configured to re-associate a UE device to a reachable SMS-IWF upon receiving a service request, such as a tracking area update (TAU) request, from the UE device if a link failure has been detected for the SMS-IWF device associated with the UE device. Thus, a pending mobile terminating (MT)-SMS delivery may be guaranteed to be delivered to the UE device no later than, for example, the next TAU request received from the UE device. The frequency of TAU requests sent by a UE device may be configurable (e.g., every 24 hours, etc.). For example, if a UE device requires more frequent communication, the TAU timer for the UE device may be set to a shorter time period. Therefore, the longest time period that it may take for an MT-SMS message to be delivered to the UE device may be guaranteed.

In some implementations, the link between the MME and the identified SMS-IWF device may include an SGs interface link. In other implementations, the link between the MME and the identified SMS-IWF device may include a different type of interface link. The service request may include a TAU request, a service request for an update from an AS device, a service request to send information to the AS device, and/or another type of service request.

The MME may be configured to provide SMS messages from an AS to UE devices, such as MTC devices. The MME may be configured to monitor links associated with SMS-IWF devices in the wireless access network associated with the MME, detect the link failure associated with the identified SMS-IWF device, and update a database (DB) that stores information relating to link failures associated with SMS-IWF devices associated with the MME based on the detected link failure.

The MME may be further configured to receive a service request from a UE device via a wireless access network, identify an SMS-IWF device associated with the UE device and determine that the identified SMS-IWF device is associated with a link failure by accessing a DB that stores information relating to link failures associated with SMS-IWF devices in the wireless access network. The MME may then instruct the UE device to detach based on determining that the identified SMS-IWF device is associated with a link failure, receive a re-attach request from the UE device, in response to instructing the UE device to detach, and assign a functioning SMS-IWF device to the UE device, in response to receiving the re-attach request.

Determining that the identified SMS-IWF device is associated with the link failure may include determining that a link associated with the identified SMS-IWF device is down and assigning the functioning SMS-IWF device may include assigning a different SMS-IWF device to the UE device. Furthermore, determining that the identified SMS-IWF device is associated with the link failure may include determining that a link associated with the identified SMS-IWF device experienced a failure since a last service request received from the UE device.

Figure 1:
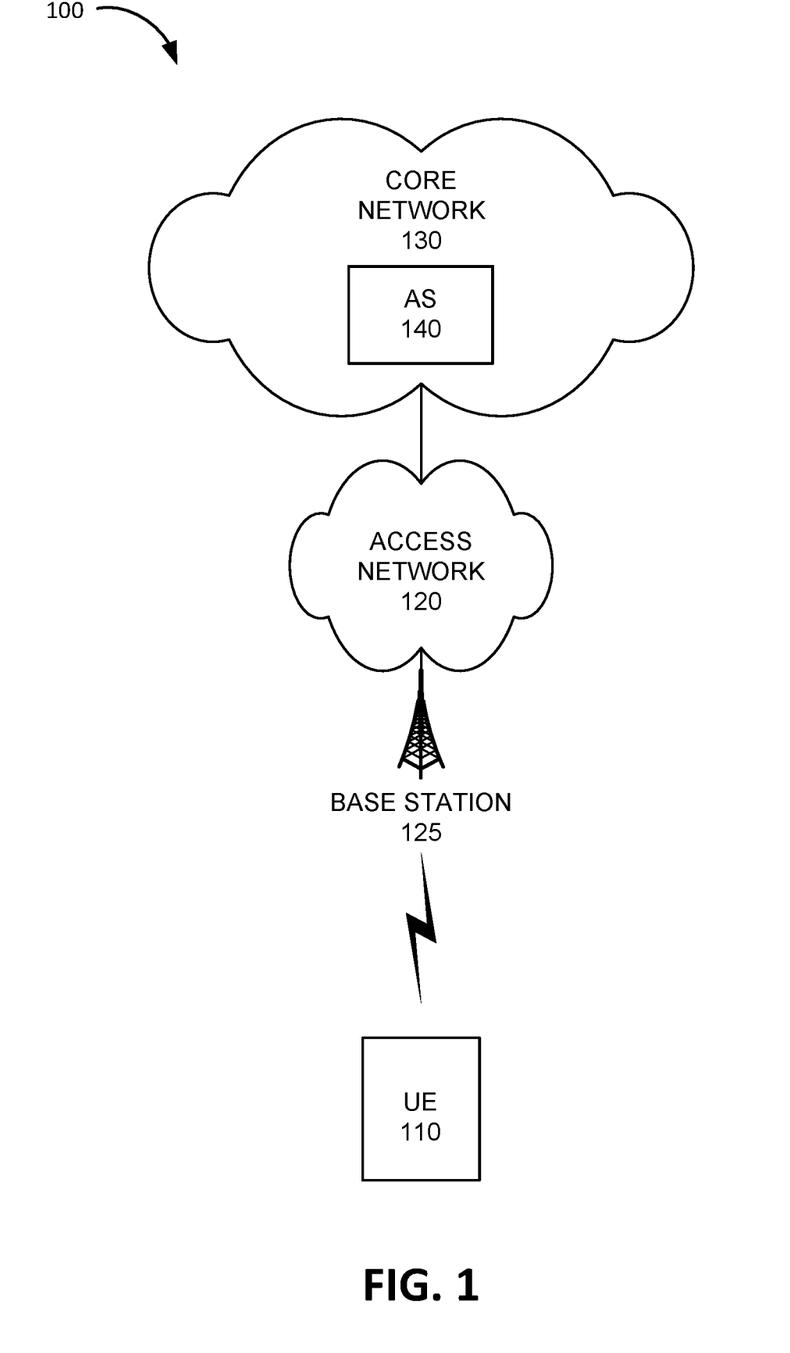
FIG. 1 is a diagram illustrating an environment according to an implementation described herein.

FIG. 1 is a diagram of an exemplary environment 100 in which the systems and/or methods, described herein, may be implemented. As shown in FIG. 1, environment 100 may include a UE device 110, an access network 120, and a core network 130.

UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, premium Internet access etc.), best effort data traffic, and/or other types of applications.

In other implementations, UE device 110 may include an Internet of Things (IoT) computer device enabled with wireless communication functionality and employing machine-to-machine (M2M) communication. In some implementations, the M2M communication may include Machine-Type Communication (MTC), a type of M2M communication standard developed by the $3^{rd}$ Generation Partnership Project (3GPP). In other implementations, the M2M communication may include a different type of communication not tied to a particular 3GPP standard. For example, UE device 110 may include an embedded wireless MTC device that communicates wirelessly with other devices over a machine-to-machine (M2M) interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

Access network 120 may provide access to core network 130 for wireless devices, such as UE device 110. Access network 120 may enable UE device 110 to connect to core network 130 for mobile telephone service, Short Message Service (SMS) message service, Multimedia Message Service (MMS) message service, Internet access, cloud computing, and/or other types of data services.

Access network 120 may establish a packet data network connection between UE device 110 and core network 130 via one or more Access Point Names (APNs). For example, access network 120 may establish an Internet Protocol (IP) connection between UE device 110 and core network 130 using a first APN and may establish a Session Initiation Protocol (SIP) connection to an Internet Multimedia Subsystem (IMS) using a second APN. In some implementations, access network 120 may include a Long Term Evolution (LTE) access network (e.g., an evolved packet core (EPC) network) based on the LTE standard specified by the 3$^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125 and UE device 110 may wirelessly communicate with access network 120 via base station 125 when UE device 110 is located within the geographic area serviced by base station 125. Base station 125 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 125) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

Core network 130 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 130 may allow the delivery of Internet Protocol (IP) services to UE device 110, and may interface with other external networks. Core network 130 may include one or more server devices and/or network devices, or other types of computation or communication devices. In some implementations, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Core network 130 may include an application server (AS) 140. AS 140 may include one or more devices, such as computer devices and/or server devices, which are configured to communicate with UE device 110 via SMS messages. For example, AS 140 may be configured to use SMS messages to collect sensor data from UE device 110, to receive reports from UE device 110, to receive error reports and/or health status reports from UE device 110, to receive billing information from UE device 110, to receive location information from UE device 110, to receive requests for instructions from UE device 110, to receive requests for updates from UE device 110, and/or to receive other types of information from UE device 110. Additionally or alternatively, AS 140 may be configured to use SMS messages to send sensor data to UE device 110, to send control instructions to an actuator associated with UE device 110, to send updates to UE device 110, to send instructions to perform particular actions by UE device 110, to send authentication information to UE device 110, to send a query for a particular type of information to UE device 110, and/or to send other types of data and/or instructions to UE device 110. In other implementations, AS 140 may be located outside of core network 130. For example, AS 140 may be located inside a private network (not shown in FIG. 1) that is connected to core network 130.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
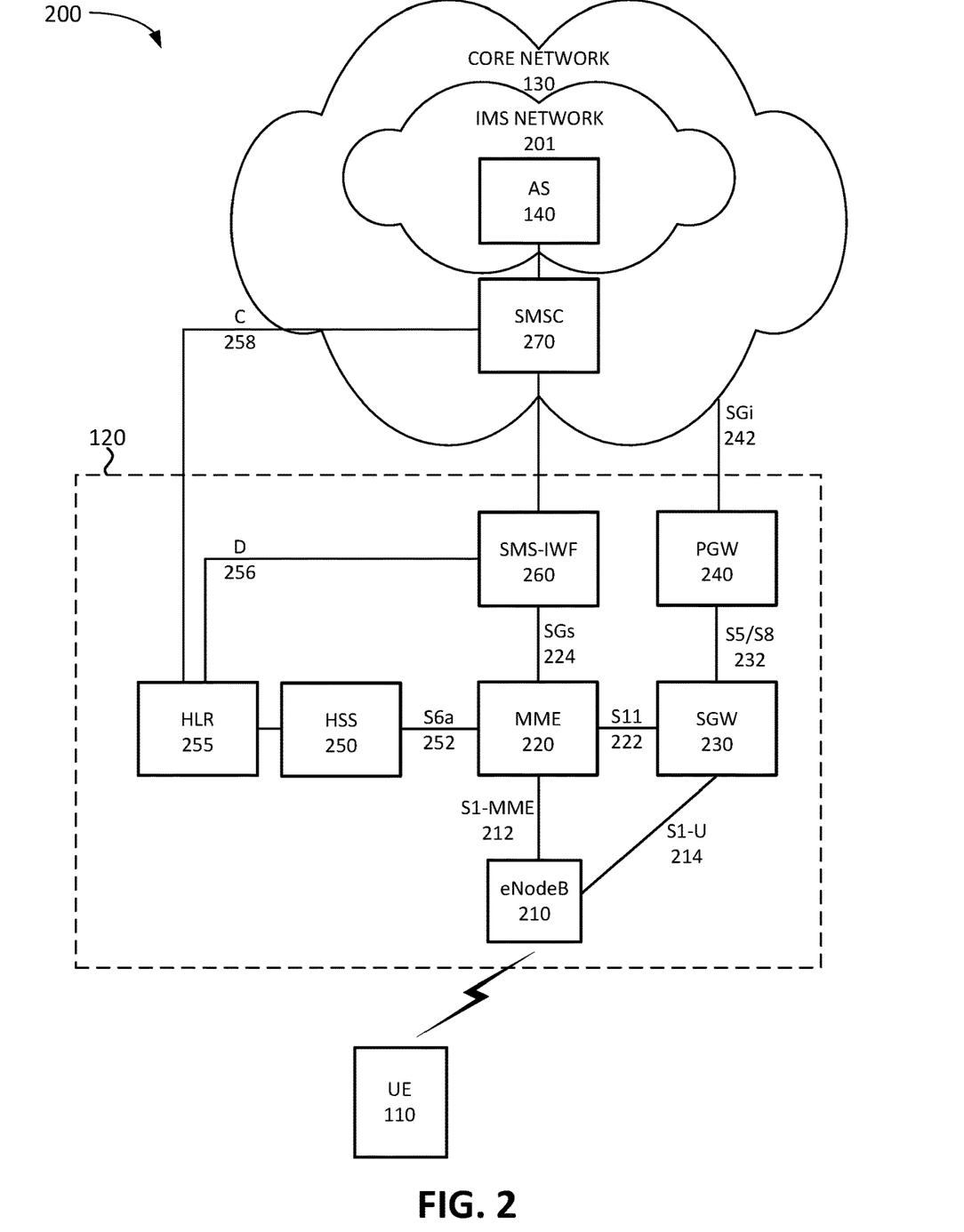
FIG. 2 is a diagram illustrating exemplary components of the access network of FIG. 1.

FIG. 2 is a diagram illustrating exemplary components of a system 200 that includes access network 120 and an IMS network 201 according to an implementation described herein. As shown in FIG. 2, IMS network 201 may be included in core network 130 and may include a network for delivering IP multimedia services as specified in various standards and/or protocols and may provide media flows, including Voice over IP (VoIP) sessions, between UE device 110 and external IP networks or external circuit-switched networks. While FIG. 2 shows AS 140 located within IMS network 201, in other implementations, AS 140 may be located outside IMS network 201. For example, AS 140 may be located in a private network and IMS network 201 may provide a connection to the private network.

As further shown in FIG. 2, access network 120 may correspond to an LTE access network and may include devices that implement logical entities interconnected via standardized interfaces, and that provide wireless packet-switched services and wireless IP connectivity to user devices for both data and voice services. Access network 120 may include eNodeB 210 (corresponding to base station 125), a mobility management entity (MME) 220, a serving gateway (SGW) 230, a packet data network gateway (PGW) 240, a home subscriber server (HSS) 250, a Home Location Register (HLR) 255, and an SMS-IWF device 260, and may interface with a Short Message Switching Center (SMSC) 270. While FIG. 2 depicts a single eNodeB 210, MME 220, SGW 230, PGW 240, HSS 250, HLR 255, SMS-IWF device 260, and an SMSC 270 for illustration purposes, in practice, FIG. 2 may include multiple eNodeBs 210, MMES 220, SGWs 230, PGWs 240, HSSs 250, SMS-IWFs 260, and/or SMSCs 270.

eNodeB 210 may include one or more devices (e.g., base stations) and other components and functionality that allow UE device 110 to wirelessly connect to access network 120 (e.g., base station 125). eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface 212 and a data plane S1-U interface 214. S1-MME interface 212 may interface with MME 220. S1-MME interface 212 may be implemented, for example, with a protocol stack that includes a Network Access Server (NAS) protocol and/or Stream Control Transmission Protocol (SCTP). An S1-U interface 214 may interface with SGW 230 and may be implemented, for example, using GTPv2.

MME 220 may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 120 and may send and receive information associated with UE devices 110, which may allow one MME 220 to take over control plane processing of UE devices serviced by another MME 220, if the other MME 220 becomes unavailable. Furthermore, MME 220 may manage SMS-IWFs 260 associated with UE devices 110 managed by MME 220 and may reassign a particular SMS-IWF device 260 associated with UE device 110 if a link failure is detected for the particular SMS-IWF device 260.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 232. S5/S8 interface 232 may be implemented, for example, using GTPv2.

PGW 240 may function as a gateway to IMS network 201 (and/or any other network associated with core network 140) through an SGi interface 242. A particular UE device 110, while connected to a single SGW 230, may be connected to multiple PGWs 240, one for each packet network with which UE device 110 communicates.

MME 220 may communicate with SGW 230 through an S11 interface 222. S11 interface 222 may be implemented, for example, using GTPv2. S11 interface 222 may be used to create and manage a new session for a particular UE device 110. S11 interface 222 may be activated when MME 220 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 210 and/or information associated with users of UE devices 210. For example, HSS 250 may store subscription profiles that include authentication and access authorization information. Each subscription profile may include a list of UE devices 210 associated with the subscription as well as an indication of which UE device 110 is active (e. g., authorized to connect to access network 120 and to core network 130). MME 220 may communicate with HSS 250 through an S6a interface 252. S6a interface 252 may be implemented, for example, using a Diameter protocol.

HLR 255 may store subscriber information relating to SMS messages. For example, HLR 255 may obtain information identifying which UE devices 110 are associated with SMS-IWF device 260 from SMS-IWF device 260 via D interface 256 and. Furthermore, HLR 255 may provide information identifying which SMS-IWF device 260 is associated with a particular UE device 110 to SMSC 270 via C interface 258.

SMS-IWF device 260 may interface access network 120 with SMSC 270. For example, each SMS-IWF device 260 may be assigned a subset of the UE devices 110 associated with MME 220. SMS-IWF device 260 may receive an SMS message from SMSC 270 and may provide the SMS message to MME 220. Moreover, SMS-IWF device 260 may receive an SMS message from MME 220 and may provide the SMS message to SMSC 270. SMS-IWF device 260 may communicate with MME 220 over a link implemented as an SGs interface 224. SGs interface 224 may be implemented, for example, using SGs Application Part (SGsAP) protocol and/or SCTP.

SMSC 270 may perform SMS routing and/or switching functions. For example, SMSC 270 may receive an SMS message from a first UE device 110 via a first SMS-IWF device 260 and may route or switch the SMS message to second UE device 110 via a second SMS-IWF device 260 if the second UE device 110 is the intended recipient of the SMS message. Furthermore, SMSC 270 may receive an SMS message from AS 140 and may route or switch the SMS message to UE device 110 via SMS-IWF device 260 if UE device 110 is the intended recipient of the SMS message. Moreover, SMSC 270 may receive an SMS message from UE device 110 via SMS-IWF device 260 and may route or switch the SMS message to AS 140 if AS 140 is the intended recipient of the SMS message. In some implementations, SMSC 270 may be located in core network 130. In other implementations, SMSC 270 may be located in access network 120.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120.

Figure 3:
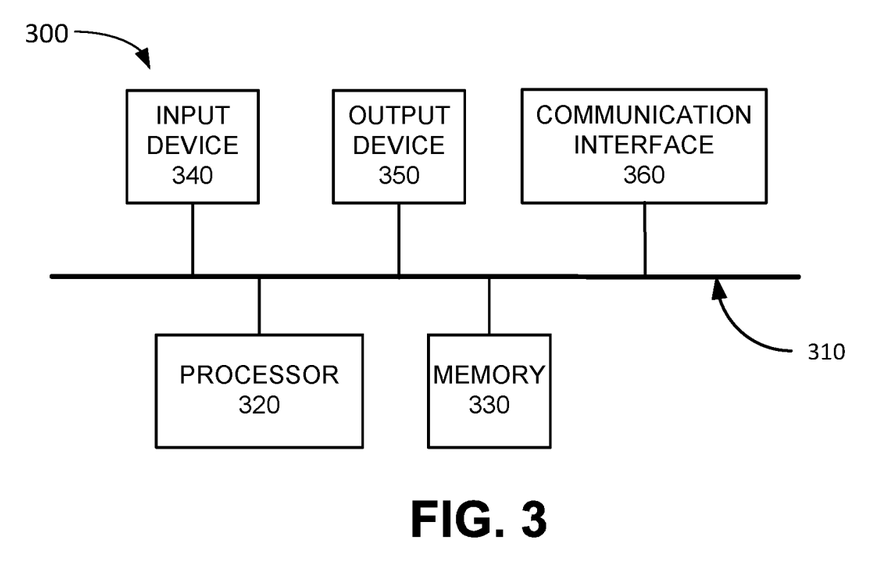
FIG. 3 is a diagram illustrating exemplary components of a device that may be included in a device of FIG. 1 or a device of FIG. 2.

FIG. 3 is a diagram illustrating example components of a device 300 according to an implementation described herein. UE device 110, AS 140, eNodeB 210, MME 220, SGW 230, PGW 240, HSS 250, HLR 255, SMS-IWF device 260, and/or SMSC 270 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to management of SMS-IWF devices. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein.

Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
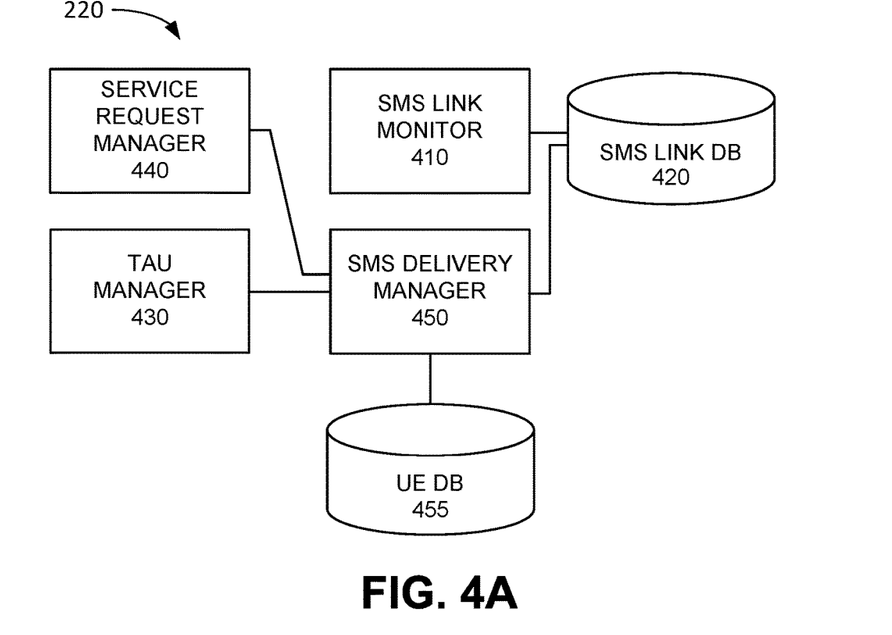
FIG. 4A is a diagram illustrating exemplary functional components of the Mobility Management Entity of FIG. 2.

FIG. 4A is a diagram illustrating exemplary functional components of MME 220. The functional components of MME 220 may be implemented, for example, via processor 320 executing instructions from memory 330. Alternatively, some or all of the functional components included in MME 220 may be implemented via hard-wired circuitry. As shown in FIG. 4A, MME 220 may include an SMS link monitor 410, an SMS link DB 420, a TAU manager 430, a service request manager 440, an SMS delivery manager 450, and a UE DB 455.

SMS link monitor 410 may monitor the health of SMS links associated with MME 220. For example, SMS link monitor 410 may monitor SGs interface links between MME 220 and SMS-IWF devices 260. In some implementations, SMS link monitor 410 may send and/or receive heartbeat messages at particular intervals to and/or from particular SMS-IWF devices 260. If a response to a heartbeat message is not received within a particular time period from the particular SMS-IWF device 260, SMS link monitor 410 may determine that a link failure occurred for the link to the particular SMS-IWF device 260. Additionally or alternatively, SMS link monitor 410 may receive an indication that a particular SMS-IWF device 260 is down from another device (e.g., HLR 255, AS 140, an administrative device associated with access network 120, etc.).

SMS link DB 420 may store information relating to the SMS links associated with MME 220. Exemplary information that may be stored in SMS link DB 420 is described below with reference to FIG. 4B.

TAU manager 430 may manage TAU requests from UE device 110. For example, TAU manager 430 may receive a TAU request from UE device 110 and process the TAU request by performing an authentication NAS security function and responding by sending a TAU accept message to UE device 110. Furthermore, TAU manager 430 may inform SMS delivery manager 450 that a TAU request has been received from UE device 110.

Service request manager 440 may manage other types of service requests from UE device 110. For example, service request manager 440 may receive a service request for an update from AS 140, a service request to send information to AS 140, and/or another type of service request. Service manager 440 may then process the service request, such as sending a message to AS 140 (e.g., by establishing a bearer from eNodeB 210 to PGW 240, etc.). Furthermore, service manager 440 may inform SMS delivery manager 450 that a service request has been received from UE device 110.

SMS delivery manager 450 may process SMS messages sent by UE device 110 or destined for UE device 110 based on information stored in UE DB 455. UE DB 455 may store information identifying UE devices 110 assigned to particular SMS-IWF devices 260. As an example, SMS delivery manager 450 may receive an SMS message from UE device 110 and may forward the SMS message to a particular SMS-IWF device 260 associated with UE device 110. As another example, SMS delivery manager 450 may receive an SMS message from SMS-IWF device 260, may identify a particular UE device 110 that is the intended recipient of the SMS message, and may forward the received SMS message to the identified particular UE device 110 via NAS signaling.

Moreover, SMS delivery manager 450 may determine, based on receiving a service request (e.g., a TAU request) from UE device 110, whether a link failure is associated with the particular SMS-IWF device 260 associated with UE device 110 by accessing SMS link DB 420. If SMS delivery manager 450 determines that SGs interface 224 link for the particular SMS-IWF device 260 is currently down or has experienced a failure since the last received service request received from UE device 110, SMS delivery manager 450 may instruct UE device 110 to perform a detach and to re-attach to access network 120. When UE device 110 re-attaches to access network 120, SMS delivery manager 450 may assign a functioning SMS-IWF device 260 to UE device 110.

Although FIG. 4A shows exemplary components of MME 220, in other implementations, MME 220 may include fewer components, different components, additional components, or differently arranged components than depicted in FIG. 4A. Additionally or alternatively, one or more components of MME 220 may perform one or more tasks described as being performed by one or more other components of MME 220.

Figure 4B:
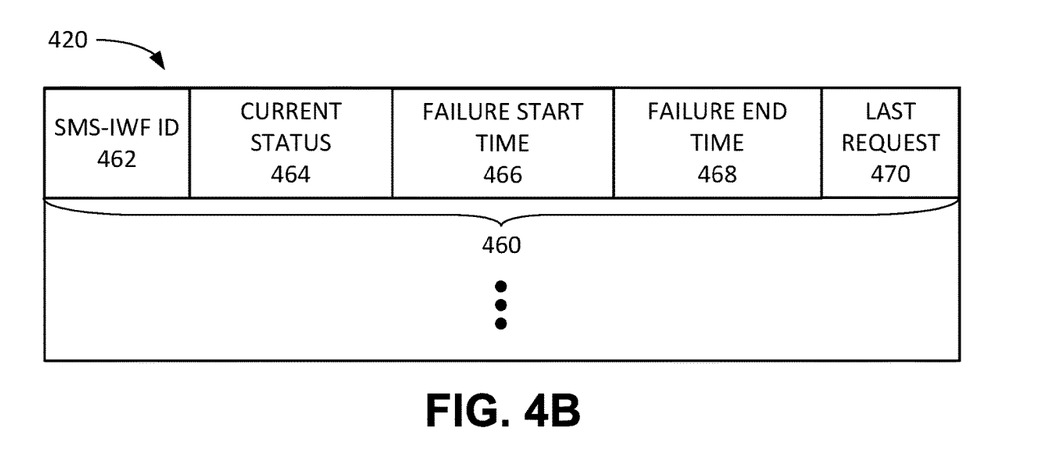
FIG. 4B is a diagram illustrating exemplary components of the Short Message Service (SMS) link database of FIG. 4A.

FIG. 4B is a diagram illustrating exemplary components that may be stored in SMS link DB 420. As shown in FIG. 4B, SMS link DB 420 may include one or more SMS link records 460. Each SMS link record 460 may store information relating to a particular SMS link. SMS link record 460 may include SMS-IWF identifier (ID) field 462, a current status field 464, a failure start time field 466, a failure end time field 468, and a last request field 470.

SMS-IWF ID field 462 may store an identifier associated with a particular SMS-IWF device 260 associated with MME 220. Current status field 464 may store information identifying a current status of SGs link 224 between the particular SMS-IWF device 260 and MME 220. For example, current status field 464 may store information identifying whether SGs link 224 is up (i.e., functioning) or down (i.e., not functioning). Failure start time field 466 may include a timestamp for a time when a most recent link failure (if any) associated with SGs link 224 was detected. Failure end time field 468 may include a timestamp for a time when the most recent link failure has ended, if there was a link failure and if the link failure has been repaired. Last request field 470 may store a timestamp for the last service request (e.g., a TAU request) received from UE device 110.

Although FIG. 4B shows exemplary components of SMS link DB 420, in other implementations, SMS link DB 420 may include fewer components, different components, additional components, or differently arranged components than depicted in FIG. 4B.

Figure 5:
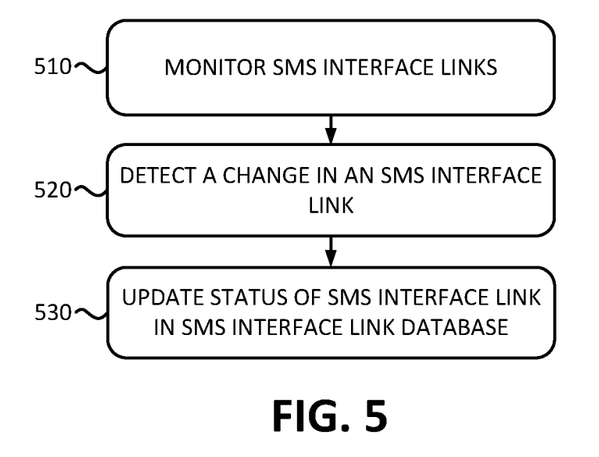
FIG. 5 is a flowchart of a process for monitoring SMS interface links according to an implementation described herein.

FIG. 5 is a flowchart of a process for monitoring Short Message Service (SMS) interface links according to an implementation described herein. In some implementations, the process of FIG. 5 may be performed by MME 220. In other implementations, some or all of the process of FIG. 5 may be performed by another device or a group of devices separate from MME 220, such as another component of access network 120.

The process of FIG. 5 may include monitoring SMS interface links (block 510). For example, SMS link monitor 410 may send and/or receive heartbeat messages at particular intervals to and/or from particular SMS-IWF devices 260. A change in an SMS interface link may be detected (block 520) and a status of the SMS interface link may be updated in an SMS interface link DB (block 530). As an example, SMS link monitor 410 may determine that a heartbeat message has not been received within a particular time period. As another example, SMS link monitor 410 may receive a message from another device (e.g., HLR 255, AS 140, an administrative device associated with access network 120, etc.) indicating that either SMS-IWF device 260 is down or that SGs interface 224 associated with SMS-IWF device 260 is down. As yet another example, SMS link monitor 410 may determine that an SMS interface link has been restored. For example, SMS link monitor 410 may receive a heartbeat message from SMS-IWF device 260 and/or may receive an indication from another device that SGs interface 224 associated with SMS-IWF device 260 has been restored. In response, SMS link monitor 410 may update SMS link record 460 associated with SMS-IWF device 260 based on the detected SMS interface link failure. For example, SMS link monitor 410 may update current status field 464, failure start time field 466, and/or failure end time field 468 of SMS link record 460.

Figure 6:
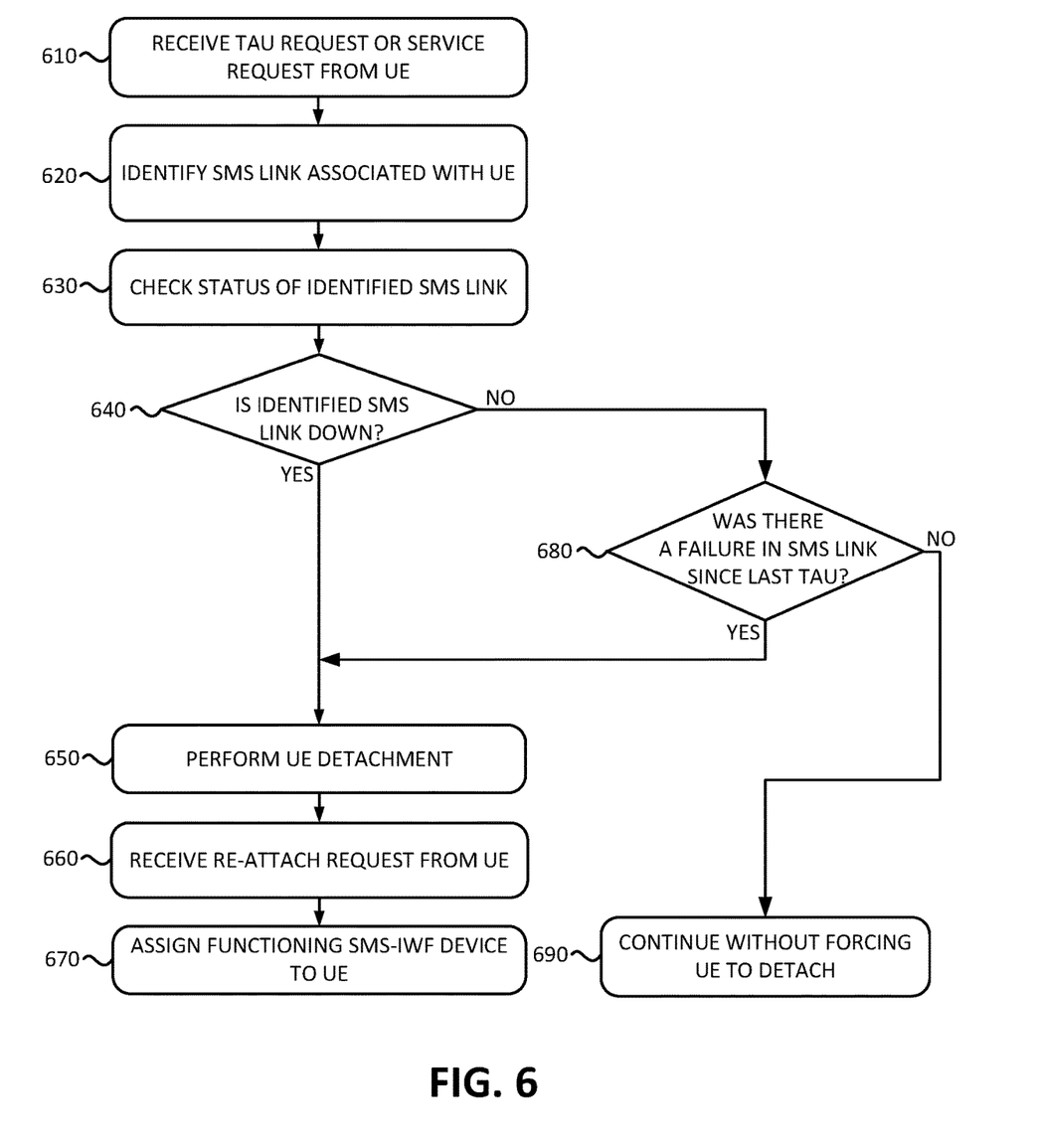
FIG. 6 is a flowchart of a process for Short Message Service Inter-working Function (SMS-IWF) reassignment according to an implementation described herein.

FIG. 6 is a flowchart of a process for Short Message Service Inter-working Function (SMS-IWF) reassignment according to an implementation described herein. In some implementations, the process of FIG. 6 may be performed by MME 220. In other implementations, some or all of the process of FIG. 6 may be performed by another device or a group of devices separate from MME 220, such as another component of access network 120.

The process of FIG. 6 may include receiving a TAU request or a service request from UE device 110 (block 610). As an example, MME 220 may receive a TAU request from UE device 110. As another example, MME 220 may receive a different type of service request, such as a request to contact AS 140. An SMS link associated with UE device 110 may be identified (block 620) and the status of the identified SMS link may be checked (block 630). For example, in response to receiving the service request, MME 220 may access UE DB 455 and may identify a particular SMS-IWF device 260 assigned to UE device 110 based on information stored in UE DB 455. MME 220 may then access SMS link DB 420 to determine the status of SGs interface 224 based on information stored in current status field 464 of SMS link record 460 associated with the identified SMS-IWF device 260.

A determination may be made as to whether the identified SMS link is down (block 640). If it is determined that the identified SMS link is down (block 640—YES), a UE detachment may be performed (block 650). For example, MME 220 may instruct UE device 110 to perform an International Mobile Subscriber Identity (IMSI) detach. A re-attach request may be received from UE device 110 (block 660) and a functioning SMS-IWF device 260 may be assigned to UE device 110 (block 670). For example, MME 220 may perform an attach procedure for UE device 110 and may then access SMS link DB 420 to select a functioning SMS-IWF device 260 based on information stored in current status field 464. In other words, MME 220 may select a particular SMS-IWF device 260 that is associated with a functioning SGs interface link 224. Furthermore, MME 220 may perform load balancing and select a particular SMS-IWF device 260 that is associated with fewer UE devices 110 than other functioning SMS-IWF devices 260 based on information stored in UE DB 455. MME 220 may then send an SGsAP message via SGs interface 224 to the selected SMS-IWF device 260.

Returning to block 640, if it is determined that the identified SMS link is not down (block 640—NO), a determination may be made as to whether there was a failure in the SMS link since the last TAU (block 680). For example, MME 220 may access SMS link record 460 associated with the identified SMS-IWF device 260 to determine whether failure start time field 466 and failure end time field 468 of SMS link record 460 both have a start time that is later than the last TAU (or another type of service request) based on the timestamp stored in last request field 470 of SMS link record 460.

If it is determined that there was a failure in the SMS link since the last TAU (block 680—YES), processing may proceed to block 650 to instruct UE device 110 to perform a detach for UE device 110, followed by receiving a re-attach request from UE device 110 and assigning a functioning SMS-IWF device 260 to UE device (blocks 650, 660, and 670). If it is determined that there was not a failure in the SMS link since the last TAU (block 680—NO), processing may continue without forcing UE device 110 to detach (block 690). For example, MME 220 may process the received service request.

Figure 7:
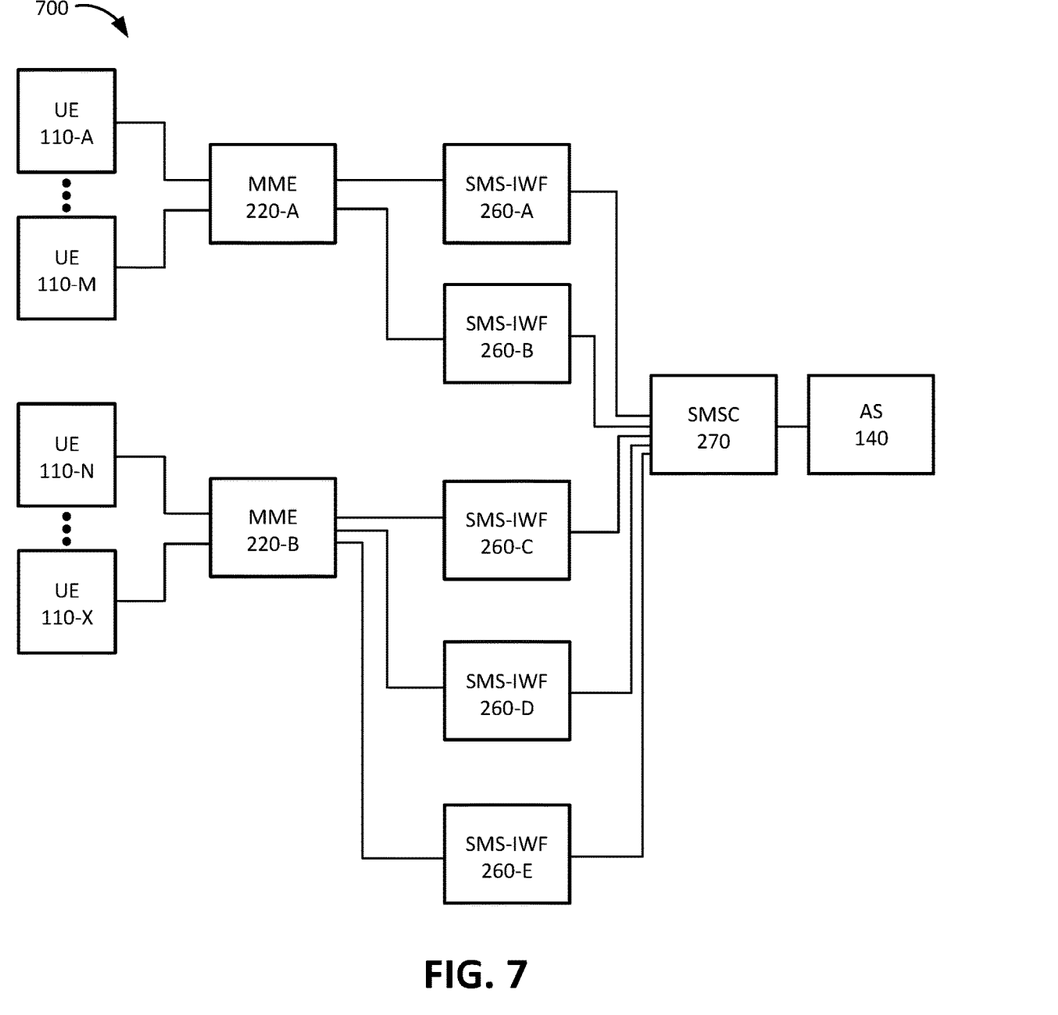
FIG. 7 is a diagram of an exemplary system according to an implementation described herein.

FIG. 7 is a diagram of an exemplary system 700 according to an implementation described herein. As shown in FIG. 7, in the exemplary system 700, MME 220-A may be associated with UE devices 110-A to 110-M and with SMS-IWF devices 260-A and 260-B. UE devices 110-A to 110-M may be distributed to SMS-IWF 260-A and 260-B. For example, a first subset of devices 110-A to 110-M may be assigned to SMS-IWF device 260-A and a second subset of UE devices 110-A to 110-M may be assigned to SMS-IWF device 260-B.

Furthermore, MME 220-B may be associated with UE devices 110-N to 110-X and with SMS-IWF devices 260-C, 260-D, and 260-E. UE devices 110-N to 110-X may be distributed to SMS-IWF 260-C, 260-D, and 260-E. For example, a first subset of devices 110-N to 110-X may be assigned to SMS-IWF device 260-C, a second subset of UE devices 110-N to 110-X may be assigned to SMS-IWF device 260-D, and a third subset of UE devices 110-N to 110-X may be assigned to SMS-IWF device 260-E.

Figure 8:
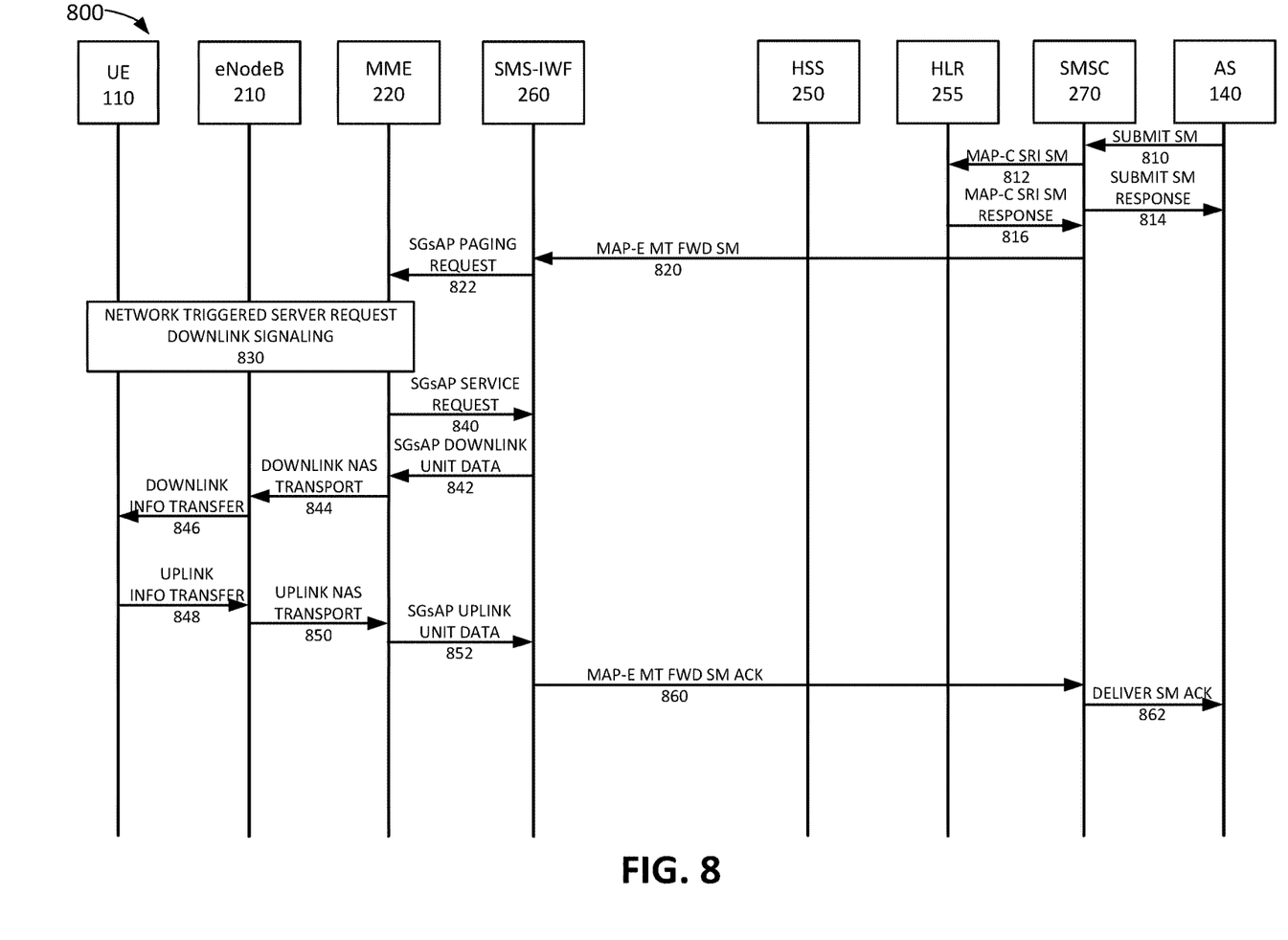
FIG. 8 is a first exemplary signal flow according to an implementation described herein.

FIG. 8 is a first exemplary signal flow 800 according to an implementation described herein. Signal flow 800 illustrates a signal flow for SMS message delivery over NAS. Signal flow 800 may include AS 140 sending an SMS message to UE device 110 by submitting the SMS message to SMSC 270 (signal 810). SMSC 270 may send a Mobile Application Part (MAP) C interface Send Routing Information (SRI) message to HLR 255 (signal 812). SMSC 270 may further acknowledge receipt of the SMS message by replying to AS 140 (signal 814). HLR 255 may provide information identifying SMS-IWF device 260 associated with UE device 110 that is the intended recipient of the SMS message in a MAP-C SRI response message (signal 816). In response, SMSC 270 may send a MAP-E mobile terminating (MT) forward SMS message to the identified SMS-IWF device 260 (signal 820).

In response, SMS-IWF device 260 may send an SGsAP paging request to MME 220 (signal 822) and MME 220, eNodeB 210, and UE device 110 may participate in network triggered server request downlink signaling (block 830). MME 220 may send an SGsAP service request (signal 840) and SMS-IWF device 260 may respond by providing the SMS message in an SGsAP downlink unit data message (signal 842). MME 220 may send a downlink NAS transport message to eNodeB 210 (signal 844) and eNodeB 210 may send a downlink info transfer message to UE device 110 (signal 846). UE device 110 may respond with an uplink info transfer message to eNodeB 210 (signal 848), eNodeB 210 may send an uplink NAS transport message to MME 220 (signal 850), and MME 220 may send an SGsAP uplink unit data to SMS-IWF 260 (signal 852).

SMS-IWF device 260 may send a MAP-E MT forward SMS acknowledgment message to SMSC 270 indicating that the SMS message has been delivered to UE device 110 (signal 860) and SMSC 270 may send an acknowledgement message to AS 140 (signal 862).

Figure 9:
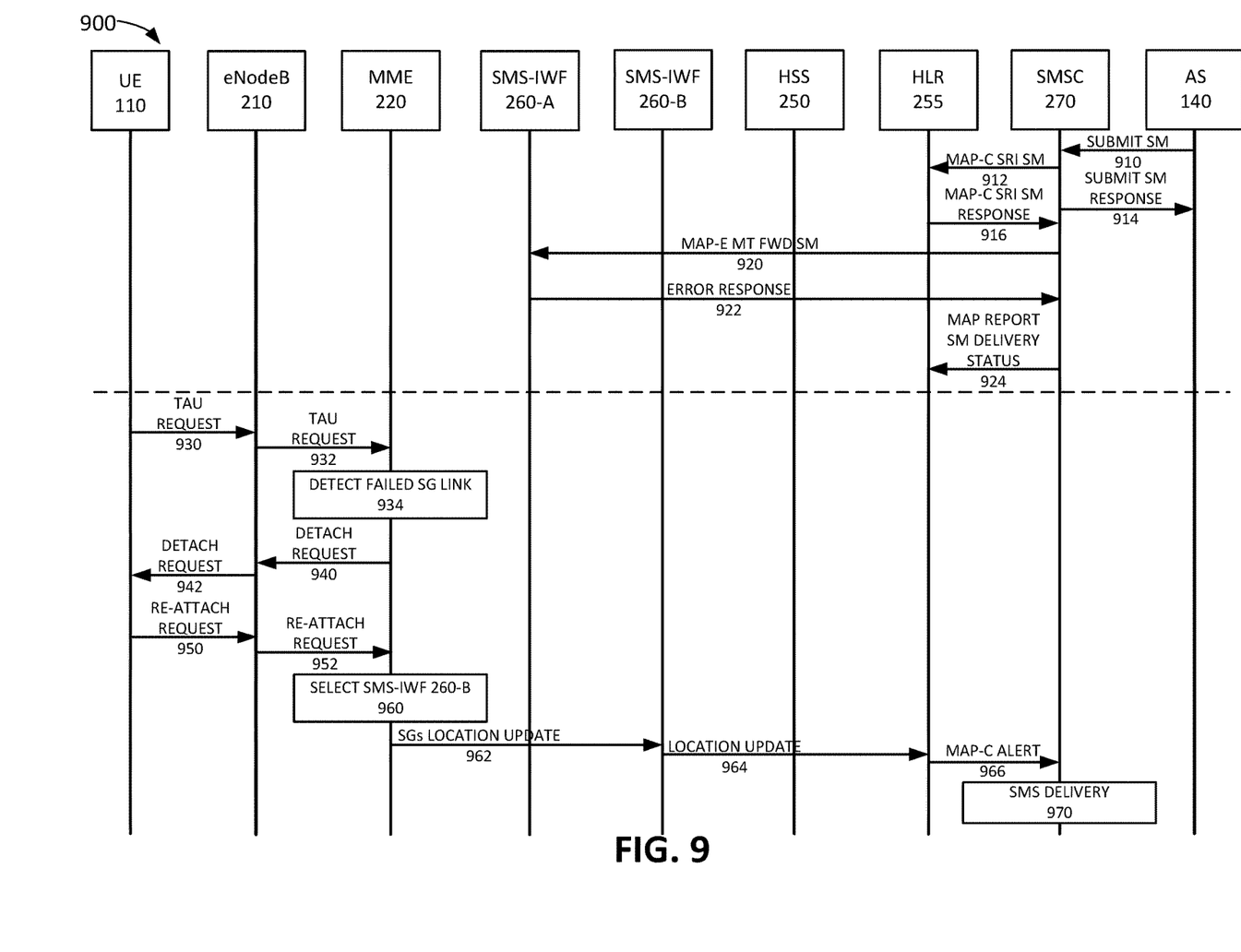
FIG. 9 is a second exemplary signal flow according to an implementation described herein.

FIG. 9 is a second exemplary signal flow 900 according to an implementation described herein. Signal flow 900 illustrates a signal flow for system 700 after SMS-IWF device 260 experiences a failure for SGs interface 224 link to MME 220. As shown in FIG. 9, signal flow 900 may include AS 140 sending an SMS message to UE device 110 by submitting the SMS message to SMSC 270 (signal 910). SMSC 270 may send a MAP-C SRI message to HLR 255 (signal 912). SMSC 270 may further acknowledge receipt of the SMS message by replying to AS 140 (signal 914). HLR 255 may provide information identifying SMS-IWF device 260 associated with UE device 110 that is the intended recipient of the SMS message in a MAP-C SRI response message (signal 916). In response, SMSC 270 may send a MAP-E MT forward SMS message to the identified SMS-IWF device 260-A (signal 920).

SMS-IWF 260-A may respond with an error response indicating that the SGs link to MME 220 is down (signal 922). In response, SMSC 270 may send a MAP report SM delivery status message to HRL 255, indicating that the SMS message was not delivered (signal 924).

At a later time, UE device 110 may send a TAU request to eNodeB 210 (signal 930) and eNodeB 210 may forward the TAU request to MME 220 (signal 932). MME 220 may detect that UE device 110 is associated with SMS-IWF device 260-A and that SMS-IWF device 260-A experienced a link failure since the last TAU request (block 934). In response, MME 220 may instruct UE device 110 to detach (signals 940 and 942). UE device 110 may detach and send a re-attach request to MME 220 via eNodeB 210 (signals 950 and 952). In response, MME 220 may select SMS-IWF device 260-B to assign to UE device 110 (block 960). Furthermore, MME 220 may send an SGs location update to SMS-IWF device 260-B (signal 962) and SMS-IWF device 260-B may send a location update to HLR 255 (signal 964). In response, HLR 255 may send a MAP-C alert message to SMSC 270 (signal 966). In response, SMC 270 may perform SMS delivery to deliver the SMS message which was not previously delivered (block 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 5 and 6, and a series of signal flows has been described with respect to FIGS. 8 and 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a computer device, that an identified Short Message Service (SMS) device, associated with a service request from a user equipment (UE) device, is associated with a link failure;
   instructing, by the computer device, the UE device to take action based on determining that the identified SMS device is associated with a link failure;
   receiving, by the computer device, a request from the UE device, in response to instructing the UE device to take action; and
   assigning, by the computer device, a functioning SMS device to the UE device, in response to receiving the request.

2. The method of claim 1, wherein instructing the UE device to take action based on determining that the identified SMS device is associated with a link failure includes:
   instructing the UE device to detach from a wireless network associated with the SMS device, based on determining that the identified SMS device is associated with the link failure; and wherein the request received from the UE device includes a re-attach request to re-attach to the wireless network.

3. The method of claim 1, further comprising:
   receiving a service request from the UE device; and
   identifying the SMS device based on the received service request, wherein the SMS device includes an SMS Inter-Working Function (IWF) device.

4. The method of claim 3, wherein determining that the identified SMS-IWF device is associated with the link failure includes:
   determining that a link associated with the identified SMS-IWF device is down; and
   wherein assigning the functioning SMS-IWF device to the UE device includes:
   assigning a different SMS-IWF device to the UE device.

5. The method of claim 3, wherein the service request corresponds to a Tracking Area Update (TAU) request, and wherein determining that the identified SMS-IWF device is associated with the link failure includes:
   determining that a link associated with the identified SMS-IWF device experienced a failure since a last TAU request received from the UE device.

6. The method of claim 3, wherein determining that the identified SMS-IWF device is associated with the link failure includes:
   accessing a database that stores information relating to link failures associated with SMS-IWF devices in a wireless access network.

7. The method of claim 3, further comprising:
   monitoring links associated with SMS-IWF devices in a wireless access network;
   detecting the link failure associated with the identified SMS-IWF device; and
   updating a database that stores information relating to link failures associated with SMS-IWF devices in the wireless access network based on the detected link failure.

8. The method of claim 3, further comprising:
   receiving an SMS message for the UE device via the assigned functioning SMS-IWF device, wherein the SMS message was sent during a time period associated with the link failure; and
   forwarding the received SMS message to the UE device.

9. The method of claim 1, wherein the service request includes at least one of:
   a service request for an update from an application server (AS) device; or
   a service request to send information to the AS device.

10. The method of claim 1, wherein the link failure includes an SGs interface link failure.

11. A computer device comprising:
a memory configured to store instructions; and
a processor configured to execute the instructions to:
determine that an identified Short Message Service (SMS) device, associated with a service request from a user equipment (UE) device, is associated with a link failure;
instruct the UE device to take action based on determining that the identified SMS device is associated with a link failure;
receive a request from the UE device, in response to instructing the UE device to take action; and
assign a functioning SMS device to the UE device, in response to receiving the request.

12. The computer device of claim 11, wherein, when instructing the UE device to take action based on determining that the identified SMS device is associated with a link failure, the processor is further configured to:
instruct the UE device to detach from a wireless network associated with the SMS device, based on determining that the identified SMS device is associated with a link failure; and wherein the request received from the UE device includes a re-attach request to re-attach to the wireless network.

13. The computer device of claim 11, wherein the processor is further configured to:
receive a service request from the UE device; and
identify the SMS device based on the received service request, and wherein the SMS device includes an SMS Inter-Working Function (IWF) device.

14. The computer device of claim 13, wherein, when determining that the identified SMS-IWF device is associated with the link failure, the processor is further configured to:
determine that a link associated with the identified SMS-IWF device is down; and
wherein, when assigning the functioning SMS-IWF device to the UE device, the processor is further configured to:
assign a different SMS-IWF device to the UE device.

15. The computer device of claim 13, wherein the service request corresponds to a Tracking Area Update (TAU) request, and wherein, when determining that the identified SMS-IWF device is associated with the link failure, the processor is further configured to:
determine that a link associated with the identified SMS-IWF device experienced a failure since a last TAU request received from the UE device.

16. The computer device of claim 13, wherein, when determining that the identified SMS-IWF device is associated with the link failure, the processor is further configured to:
access a database that stores information relating to link failures associated with SMS-IWF devices in the wireless access network.

17. The computer device of claim 13, wherein the processor is further configured to:
monitor links associated with SMS-IWF devices in a wireless access network;
detect the link failure associated with the identified SMS-IWF device; and
update a database that stores information relating to link failures associated with SMS-IWF devices in the wireless access network based on the detected link failure.

18. The computer device of claim 13, wherein the processor is further configured to:
receive a Short Message Service (SMS) message for the UE device via the assigned functioning SMS-IWF device, wherein the SMS message was sent during a time period associated with the link failure; and
forward the received SMS message to the UE device.

19. A system comprising:
a plurality of Short Message Service Inter-Working Function (SMS-IWF) devices configured to send and receive Short Message Service (SMS) messages to a plurality of user equipment (UE) devices; and
a Mobility Management Entity (MME) configured to:
determine that an identified SMS-IWF device, of the plurality of SMS-IWF devices and associated with a particular UE device of the plurality of UE devices, is associated with a link failure; and
assign a functioning SMS-IWF device, of the plurality of SMS-IWF devices, to the particular UE device, when the particular UE device re-attaches to the MME.

20. The system of claim 19, wherein the MME is further configured to:
monitor links associated with the plurality of SMS-IWF devices;
detect the link failure associated with the identified SMS-IWF device; and
update a database that stores information relating to link failures associated with the plurality of SMS-IWF devices based on the detected link failure.

* * * * *